United States Patent
Lu

(10) Patent No.: US 6,473,979 B2
(45) Date of Patent: Nov. 5, 2002

(54) ELECTRONIC TALKING COMPASS

(76) Inventor: Clive S. Lu, 282 Newbridges Rd., Hicksville, NY (US) 11801

( * ) Notice: Subject to any disclaimer, the term of this patent is extended or adjusted under 35 U.S.C. 154(b) by 27 days.

(21) Appl. No.: 09/729,429

(22) Filed: Dec. 5, 2000

(65) Prior Publication Data

US 2002/0066194 A1 Jun. 6, 2002

(51) Int. Cl.⁷ .................. G01C 17/26; G01C 17/02; G01C 17/38
(52) U.S. Cl. .................. 33/363 K; 33/355 R; 33/356
(58) Field of Search .................. 33/355 R, 356, 33/357, 360, 363 R, 363 K, 363 Q, 366.11, 760, 301, 348, 349, 351, 352

(56) References Cited

U.S. PATENT DOCUMENTS

| | | | | |
|---|---|---|---|---|
| 1,998,948 A | * | 4/1935 | Wittkuhns et al. | 33/360 |
| 2,118,082 A | * | 5/1938 | Hammond, Jr. | 33/349 |
| 2,360,330 A | * | 10/1944 | Chance | 33/359 |
| 2,361,973 A | * | 11/1944 | Smith | 33/363 |
| 2,463,245 A | * | 3/1949 | Chance | 33/359 |
| 3,802,088 A | | 4/1974 | Barrett et al. | 33/349 |
| 4,037,328 A | | 7/1977 | Kuehn et al. | 33/349 |
| 4,104,803 A | | 8/1978 | Hoeppel | 33/352 |
| 4,146,970 A | * | 4/1979 | Edwards | 33/363 K |
| 4,190,962 A | * | 3/1980 | Lyman, Jr. | 33/363 K |
| 4,250,626 A | * | 2/1981 | Lazar | 33/363 R |
| 4,402,142 A | | 9/1983 | Dinsmore | 33/348 |
| 4,512,667 A | * | 4/1985 | Doulton et al. | 368/10 |
| 4,857,840 A | * | 8/1989 | Lanchais | 324/207 |
| 4,862,594 A | * | 9/1989 | Schierbeek et al. | 33/356 |
| 4,937,945 A | * | 7/1990 | Schofield et al. | 33/356 |
| 5,079,845 A | * | 1/1992 | Childers | 33/363 K |
| 5,095,630 A | * | 3/1992 | Nomura et al. | 33/356 |
| 5,157,841 A | | 10/1992 | Dinsmore | 33/361 |
| 5,241,270 A | * | 8/1993 | Ng | 324/251 |
| 5,253,424 A | * | 10/1993 | Kendall | 33/355 R |
| 5,737,247 A | * | 4/1998 | Baer et al. | 364/565 |
| 5,749,150 A | | 5/1998 | McDermott | 33/361 |
| 6,192,315 B1 | * | 2/2001 | Geschke et al. | 701/224 |
| 6,286,220 B1 | * | 9/2001 | Harrison et al. | 33/355 R |

FOREIGN PATENT DOCUMENTS

| | | | | |
|---|---|---|---|---|
| GB | 2093591 A | * | 9/1982 | 33/361 |
| JP | 01209315 A | * | 8/1989 | 33/356 |

* cited by examiner

*Primary Examiner*—Diego Gutierrez
*Assistant Examiner*—Mirellys Jagan
(74) *Attorney, Agent, or Firm*—Welsh & Flaxman LLC

(57) ABSTRACT

The invention relates to an electronic compass adapted for providing users with an audible indication of direction. The compass includes a housing assembly having a speaker for providing a user with information concerning the orientation of the housing assembly relative to the earth's magnetic field. The compass further includes a Hall Effect detector for determining the orientation of the housing assembly relative to the Earth's magnetic field and a translator for translating the orientation data relating to the position of the housing assembly relative to the earth's magnetic field into an auditory signal which is transmitted to the speaker assembly for translation into an audible signal providing a user with audible instructions regarding the orientation of the housing assembly.

7 Claims, 3 Drawing Sheets

ELECTRONIC TALKING COMPASS

BACKGROUND OF THE INVENTION

1. Field of the Invention

The invention relates to an electronic talking compass. More particularly, the invention relates to a talking compass utilizing Hall Effect calculations in the determination of the existing magnetic field.

2. Description of the Prior Art

Navigation tools are demanded by a variety of individuals participating in outdoor activities. For example, hikers, fishermen, hunters, travelers, boaters, and others are consistently confronted with the need for determining their orientation relative to the earth's magnetic field. In most instances, these individuals rely upon conventional needle-type compasses.

Unfortunately, such compasses are often difficult to use and offer only limited accuracy. The difficultly in using these prior art devices is especially problematic where the individual needing to determine his or her orientation does not have the freedom to stop what he or she is doing to sit and read the compass. As such, these individuals must either stop what they are doing and take a compass measurement or continue on in their activity without taking a compass measurement. Whether the individual stops to take the measurement or skips the measurement, the result is undesirable and will likely have detrimental effects. In addition to the shortcomings discussed, traditional compasses are very difficult to read without proper lighting and may be completely useless where the individual does not have sufficient light available to read the position of the compass needle.

While attempts have been made to provide more convenient compasses, a need continues to exist for a convenient, reliable and relatively inexpensive compass. The present invention provides such a compass.

SUMMARY OF THE INVENTION

It is, therefore, an object of the present invention to provide an electronic compass adapted for providing users with an audible indication of direction. The compass includes a housing assembly having a speaker for providing a user with information concerning the orientation of the housing assembly relative to the earth's magnetic field. The compass further includes a system for determining the orientation of the housing assembly relative the earth's magnetic field and generating orientation data. The system employs a Hall Effect detector for determining the orientation of the housing assembly relative to the Earth's magnetic field. The compass also includes the ability to translate the orientation data relating to the position of the housing assembly relative to the earth's magnetic field into an auditory signal which is transmitted to the speaker assembly for translation into an audible signal providing a user with audible instructions regarding the orientation of the housing assembly.

It is also an object of the present invention to provide an electronic compass including a battery powering the electronic compass.

It is another object of the present invention to provide an electronic compass wherein the ability to translate is achieved via a microprocessor programmed to translate the orientation data into an auditory signal.

It is a further object of the present invention to provide an electronic compass wherein the audible instructions are spoken words.

It is also an object of the present invention to provide an electronic compass wherein the audible instructions are spoken words.

It is also another object of the present invention to provide an electronic compass including an optical polarity detecting device working in conjunction with the Hall Effect detector.

It is still a further object of the present invention to provide an electronic compass wherein the Hall Effect detector performs calibrations for the optical polarity detecting device.

It is yet another object of the present invention to provide an electronic compass wherein results derived by the optical polarity detecting device are compared with directional information from the Hall Effect detector.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
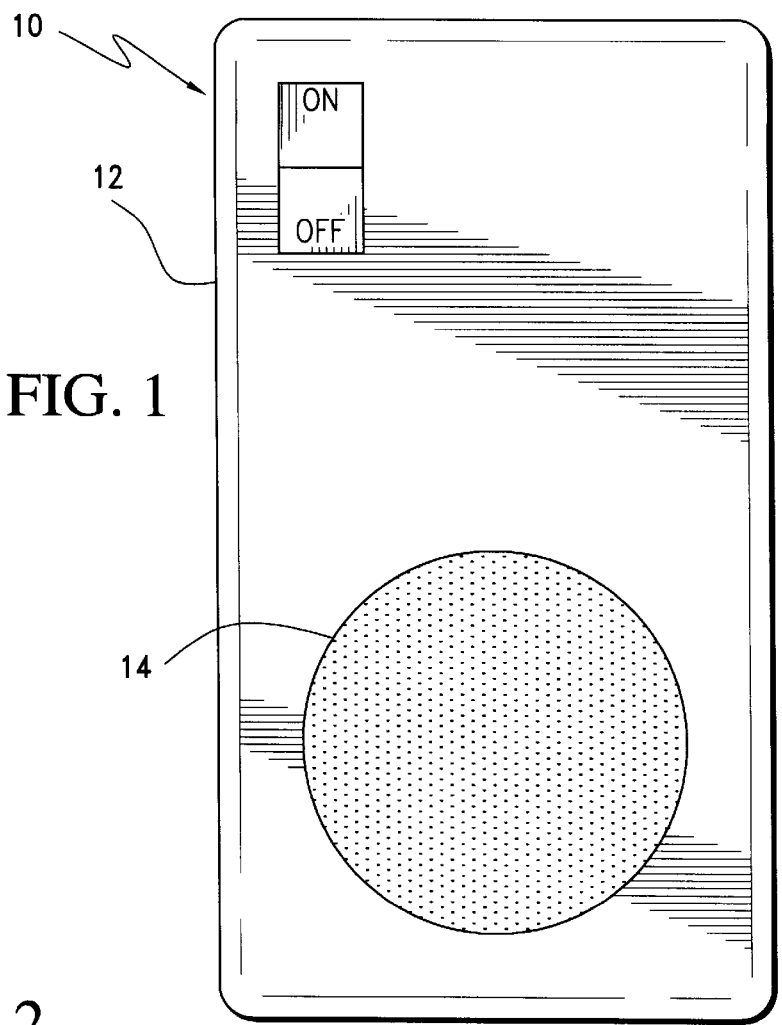
FIG. 1 is a perspective view of a compass in accordance with the present invention.

With reference to FIG. 1, an electronic compass 10 adapted for providing users with an audible indication of direction is disclosed. The electronic compass 10 includes a housing assembly 12 having the hardware and software required for providing a user with an audible indication as to his or her orientation contained therein. With this in mind, the housing assembly 12 is preferably formed so as to be a hand-held device which may be readily carried by hikers, fishermen, hunters, travelers, boaters, and anyone else who might be concerned with their orientation relative to the earth's magnetic field. Although it is contemplated that the present invention is to be a hand-held device, the compass 10 may be embodied in various forms without departing from the spirit of the present invention.

Figure 2:
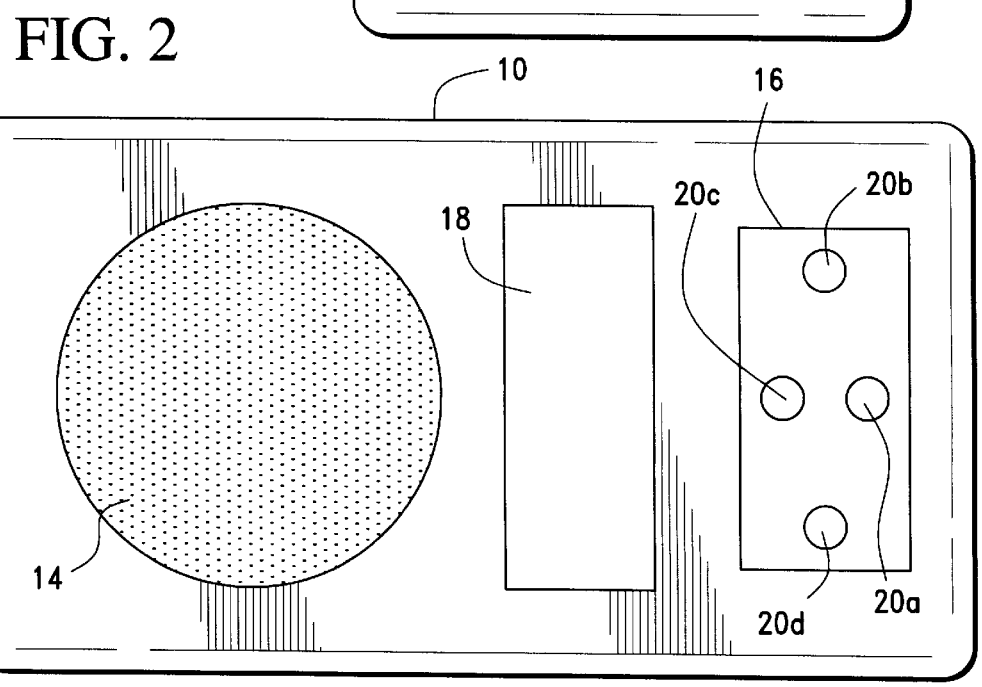
FIG. 2 is a schematic of the electrical hardware housed with the housing assembly of the compass shown in FIG. 1.

With reference to FIG. 2, the general components contained within the housing assembly 12 are disclosed. Specifically, the electronic compass 10 includes a speaker 14, Hall Effect direction detector 16 and a translator 18. The speaker 14 may be any conventional speaker capable of converting an electrical signal into an audible signal understandable by those using the present compass. While a conventional speaker is preferred for use in accordance with a preferred embodiment of the present invention, the speaker itself does not form a critical component of the present invention and may, therefore, take a wide variety of forms without departing from the spirit of the present invention.

Figure 3:
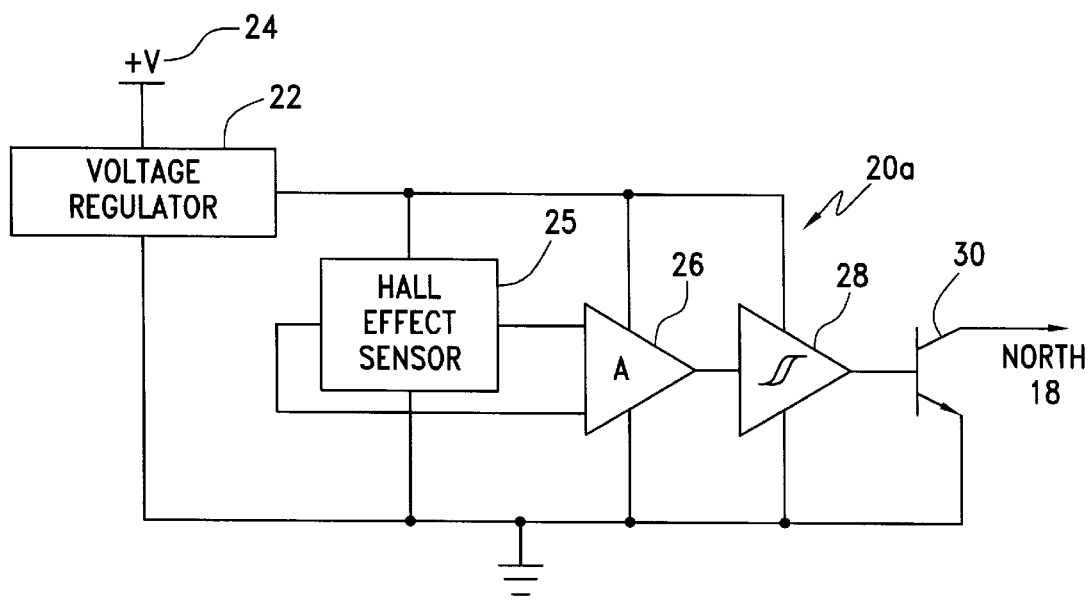
FIG. 3 is a schematic of an exemplary Hall Effect sensor assembly which may be used in accordance with the present invention.

The Hall Effect detector 16 relies upon a series of switches to identify the orientation of the housing assembly 12 relative to the earth's magnetic field. Such Hall Effect detectors are disclosed in U.S. Pat. Nos. 5,157,841 and 4,402,142 both to Dinsmore which are incorporated herein by reference. Briefly, and with reference to FIG. 2, the Hall Effect detector is composed of four Hall Effect sensor assemblies 20a–d which may be used in accordance with the present invention. Referring to FIG. 3, each Hall Effect sensor assembly 20a–d includes a voltage regulator 22 connected to a positive d.c. voltage source such as a battery 24 stored within the housing assembly 12 (or an external battery coupled to the housing assembly 12 using various known techniques). A Hall Effect sensor 25 has current input leads connected across the regulated d.c voltage and ground outputs of the regulator 22, and field sensing output leads connected to the inputs of an operational amplifier 26. The output of the amplifier 26, which varies as a function of the strength and polarity of the magnetic field sensed by the Hall Effect sensor 25, is connected to the input of a Schmitt trigger 28. The Schmitt trigger 28 provides a digital output to the base of an NPN transistor 30 which switches from a low or ground state to a high or positive state when the strength of the magnetic field sensed by the sensor 25 exceeds a preselected threshold level at a preselected polarity. The emitter of the NPN transistor 30 is connected to ground and the collector provides a digital signal indicative of a selected cardinal orientation, north in the case of the Hall Effect sensor assembly 20a. As mention above, the remaining Hall Effect sensor assemblies 20b–d are identical to the one shown in FIG. 4.

The magnetic polarity to which each sensor assembly 20a–d is responsive is selected by positioning of sensor assemblies with respect to the float axis of rotation. All of the sensor assemblies 20a–d are identically oriented with respect to the float axis and, in the embodiment to be described herein, are responsive to proximity of the south magnetic region to switch the collector of transistor 30 to ground.

The collectors of the various transistors 30 of the sensor assemblies 20a–d are connected to corresponding inputs of the translator 18 which provides an output to the speaker 14. The translator 18 is preferably a microprocessor programmed to convert the signal generated by the Hall Effect detector 16 into an auditory signal which is transmitted to the speaker 14 assembly for translation into an audible signal providing a user with audible instructions regarding the orientation of the housing assembly 12. The auditory signal generated in accordance with the present invention may take a variety of forms within in the spirit of the present invention. In accordance with a preferred embodiment of the present invention, the audible instructions are in the form of generated words clearly identifying the required directional information. This directional information may be provided in a variety of languages for added versatility.

Figure 4:
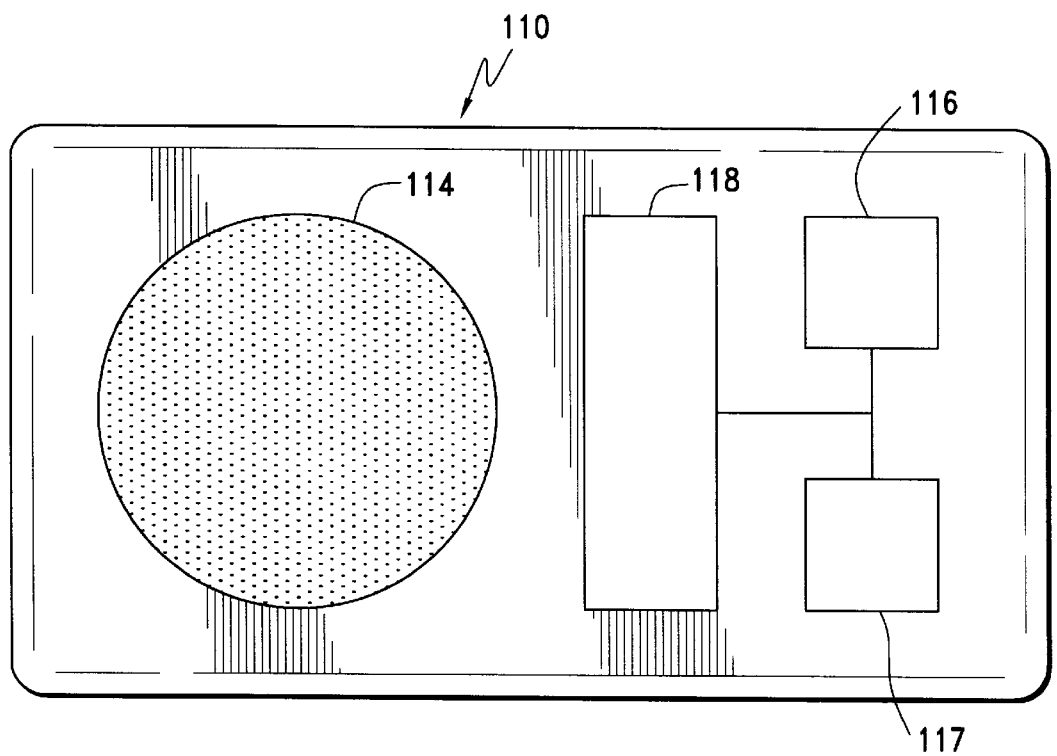
FIG. 4 is a schematic of an alternate embodiment in accordance with the present invention.

With reference to FIG. 4, the electronic compass may be further enhanced by the provision of supplemental polarity detecting devices used in conjunction with the Hall Effect detector. Specifically, the electronic compass 110 according to this embodiment includes a speaker 114, Hall Effect direction detector 116 (similar to that disclosed above), an optical polarity detection device 117 and a translator 118. As with the previous embodiment, the speaker 114 may be any conventional speaker capable of converting an electrical signal into an audible signal understandable by those using the present compass. While a conventional speaker is preferred for use in accordance with a preferred embodiment of the present invention, the speaker itself does not form a critical component of the present invention and may, therefore, take a wide variety of forms without departing from the spirit of the present invention.

The present embodiment operates by utilizing the Hall Effect direction detector 116 for determining "North" for initial calibration purposes. Once the system is properly calibrated based upon the calculations of the Hall Effect direction detector 116, the optical polarity detection device 117 identifies the exact direction. The direction identified by the optical polarity detection device 117 is then compared with directional information obtained by the Hall Effect direction detector 116 to confirm the directional results. Finally, the directional information is forwarded to the translator 118 for providing an audible indication to the user.

With regard to the confirmation step discussed above, it is contemplated that authentication is achieved by first confirming data generated by the Hall Effect with the earth North (by any observing devices). This information is recorded and saved at the memory residence by the user. New data generated by the optical device is then calculated and compared with the recorded data based upon either radius or angular deviation away from the recorded data.

Figure 5:
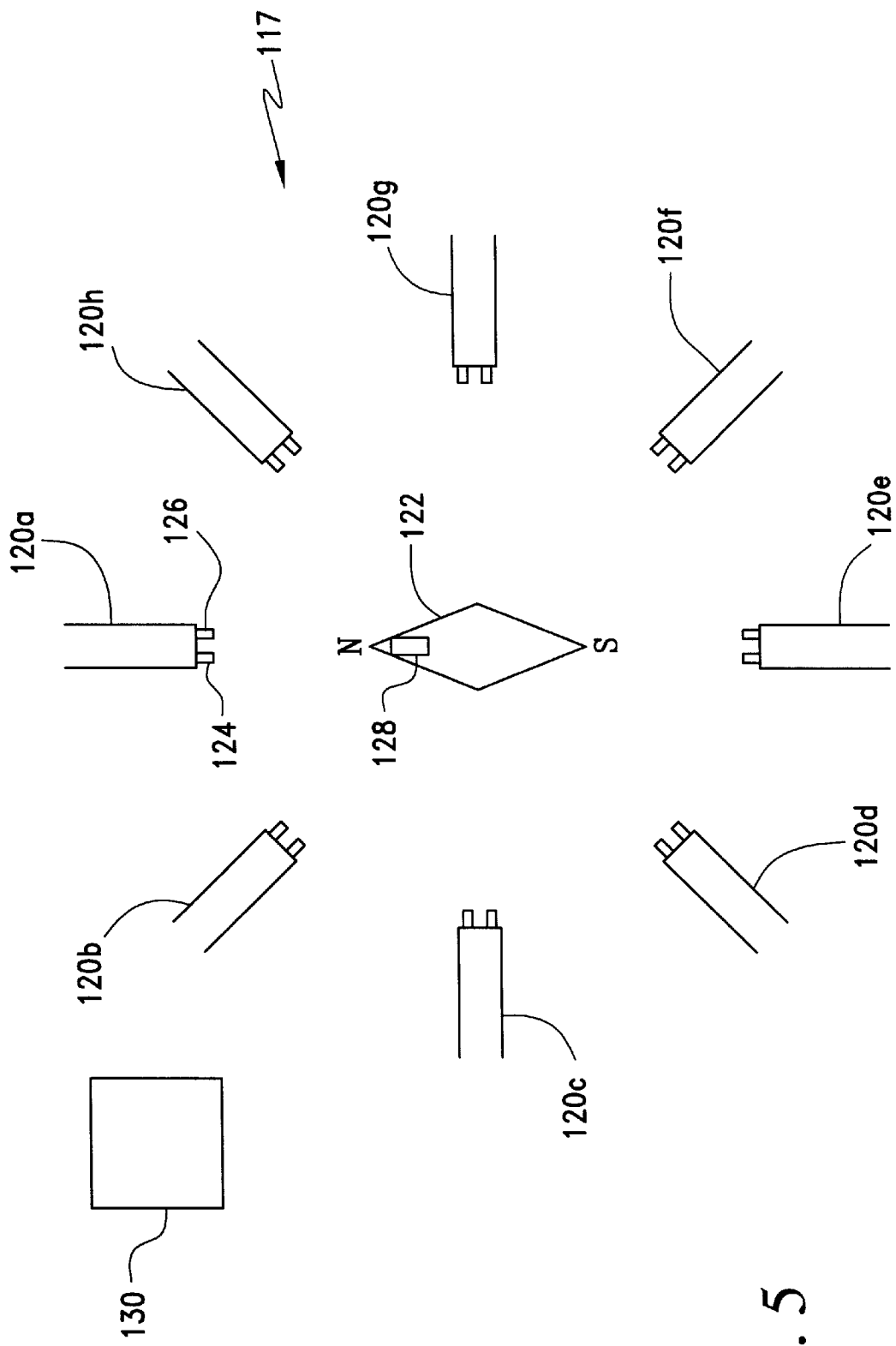
FIG. 5 is a schematic of an optical polarity detecting device in accordance with the embodiment disclosed in FIG. 4.

With reference to FIG. 5, an optical polarity detection device 117 in accordance with the present invention is disclosed. The optical polarity detection device 117 includes a minimum of 8 optical detecting modules 120a–h devices surrounding a polarity device 122. The detecting modules 120a–h detect by the transmitting and receiving functions in either open circuit or closed circuit. Each optical detecting module 120a–h includes a transmitting device 124 and a receiving device 126. A reflecting device 128 is mounted at the north, for example, polarity end of the polarity device 122.

In operation, when the transmitting device 124 transmits light, the light beam travels in a direct line and hits the reflector device 128. The reflector device 128 reflects the light which is then detected by the receiver device 126. The received signal is then sent to a processor 130 for processing before be transmitted to the translator 118.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. An electronic compass adapted for providing users with an audible indication of direction, comprising:

a housing assembly including a speaker for providing a user with information concerning the orientation of the housing assembly relative to the earth's magnetic field;

means for determining the orientation of the housing assembly relative the earth's magnetic field and generating orientation data, the means employing a Hall Effect detector for determining the orientation of the housing assembly relative to the Earth's magnetic field and an optical polarity detecting device working in conjunction with the Hall Effect detector, the Hall Effect detector further performing calibrations for the optical polarity detecting device wherein the data derived from the Hall Effect detector and optical polarity device are compared prior to further processing by a means for translating;

the means for translating translates the orientation data relating to the position of the housing assembly relative to the earth's magnetic field into an auditory signal which is transmitted to a speaker assembly for translation into an audible signal providing a user with audible instructions regarding the orientation of the housing assembly; and wherein the optical polarity detection device includes eight optical detecting modules surrounding a polarity device, the optical detecting modules detect by transmitting light to and receiving light from the polarity device.

2. The electronic compass according to claim 1, further including a battery powering the electronic compass.

3. The electronic compass according to claim 1, wherein the audible instructions are spoken words.

4. The electronic compass according to claim 1, wherein the optical polarity detecting device includes a transmitting and receiving function, and the transmitting and receiving function may be performed as either an open circuit or a closed circuit.

5. The electronic compass according to claim 1, wherein each optical detecting module includes a transmitting device transmitting light toward the polarity device and a receiving device receiving light reflected by the polarity device.

6. The electronic compass according to claim 1, wherein the means for translating is a microprocessor programmed to translate the orientation data into an auditory signal.

7. The electronic compass according to claim 6, wherein the audible instructions are spoken words.

* * * * *